United States Patent [19]

Mazzarins

[11] 3,773,134
[45] Nov. 20, 1973

[54] STEERING MECHANISM FOR ARTICULATED VEHICLE

[75] Inventor: Janis Mazzarins, Macedonia, Ohio

[73] Assignee: General Motors Corporation, Detroit, Mich.

[22] Filed: Sept. 20, 1972

[21] Appl. No.: 290,453

[52] U.S. Cl. .............................. 180/79.2 B, 280/469
[51] Int. Cl. ................................................ B62d 5/10
[58] Field of Search ..................... 180/79.2 B, 51; 280/464, 469

[56] References Cited
UNITED STATES PATENTS

| | | | |
|---|---|---|---|
| 2,532,786 | 12/1950 | Richter | 180/79.2 B |
| 2,614,644 | 10/1952 | Gustafson | 180/79.2 B |
| 2,917,125 | 12/1959 | Donner et al. | 180/79.2 B |

Primary Examiner—Benjamin Hersh
Assistant Examiner—John A. Pekar
Attorney—William S. Pettigrew et al.

[57] ABSTRACT

A steering mechanism for an articulated vehicle having first and second frame sections which are pivotally interconnected about a vertical steering axis for relative steering articulation therebetween to either side of straight-ahead alignment of the frame sections. The steering mechanism is characterized by having a pinion fixed to one of the frame sections, while the other frame section supports a pair of double-acting hydraulic steering cylinders positioned along axes which are parallel to the longitudinal axis of the vehicle. The piston portion of each hydraulic cylinder is formed with a rack which meshes with the pinion and is maintained in engagement therewith through a guide roller having a pair of radially extending flanges.

4 Claims, 7 Drawing Figures

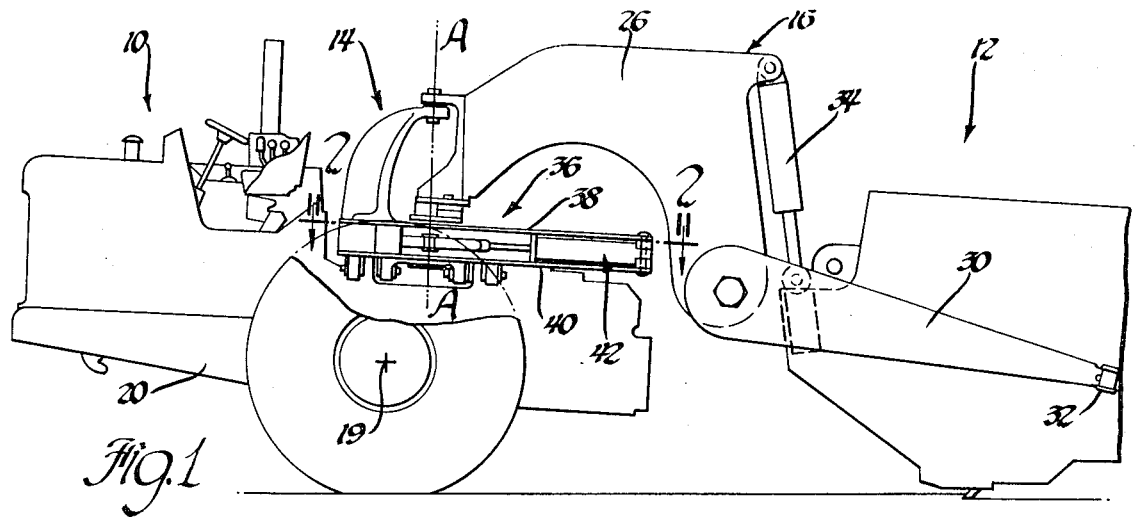
Fig. 1
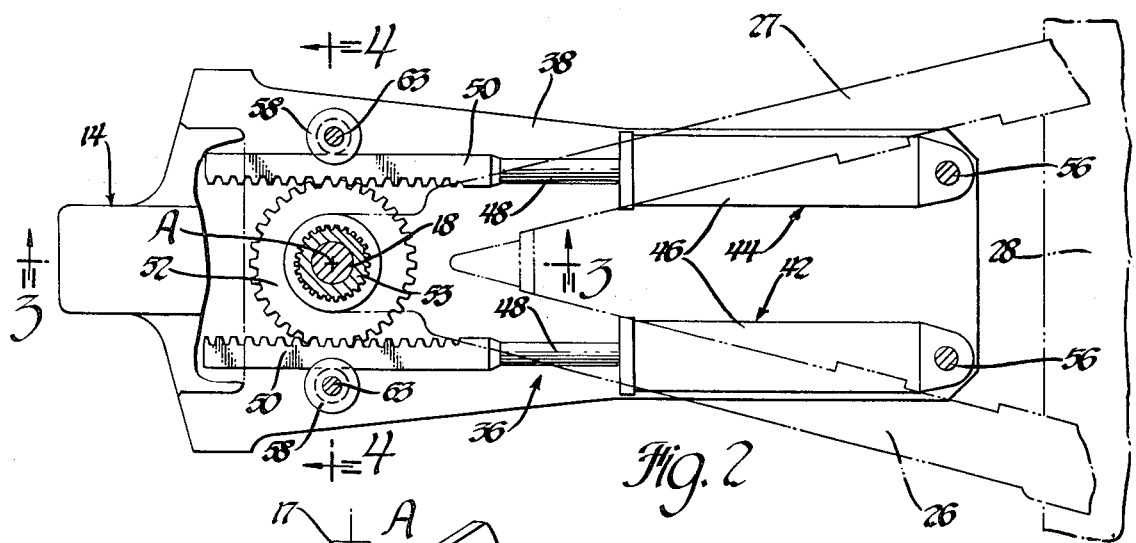
Fig. 2
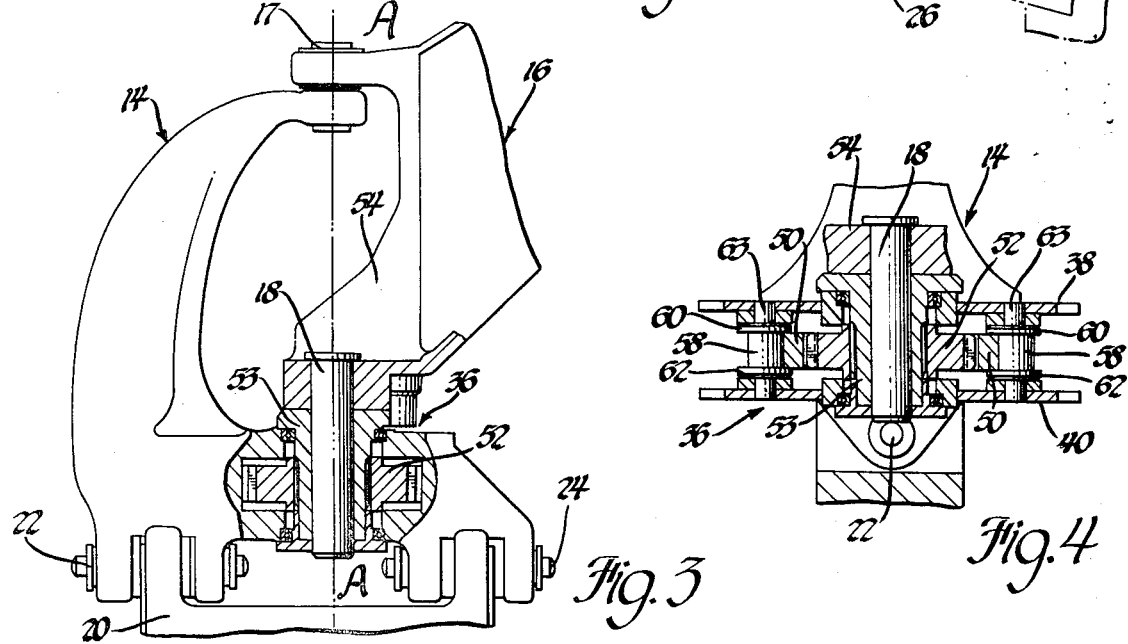
Fig. 3
Fig. 4

STEERING MECHANISM FOR ARTICULATED VEHICLE

This invention concerns a steering mechanism for a vehicle and more particularly a steering arrangement which is suitable for an articulated vehicle such as an off-highway earthmoving scraper. As is well known, most scrapers include a tractor and a trailing bowl which are interconnected for relative articulation about a vertical steering axis. The connection between the tractor and bowl incorporates a steering frame member carried by the tractor for oscillation about a horizontal axis extending parallel to the longitudinal axis of the tractor. A pull yoke frame member includes a gooseneck which is hingedly connected to the steering frame member by upper and lower king-pins located along the vertical steering axis so that relative steering articulation of the tractor and the trailing bowl to either side of straight-ahead steering alignment can be realized.

The present invention is incorporated with a scraper of the above-described type and one form thereof has the lower king-pin rigidly fixed with the pull yoke frame member and has a pinion splined thereto. A pair of double-acting hydraulic steering cylinders are mounted on the steering frame member along laterally spaced axes which are parallel to the longitudinal axis of the vehicle and located on opposite sides of the vertical steering axis. Each of the steering cylinders includes a piston member and a cylinder member with the base end of each cylinder member being connected to the associated steering frame member. In addition, each piston member has the rod portion thereof formed with a rack which meshes with the pinion and is maintained in engagement with the pinion by a roller which serves as a guide for the rack during operation of the hydraulic cylinders.

In another form of the invention, the upper king-pin is splined to the pinion and is fixed with the steering frame member. The steering cylinders are mounted on the pull yoke frame member in a manner whereby the rear end of each cylinder member extends through an opening provided in the gooseneck for connection with a cross bar member. This arrangement permits the steering cylinders to maintain a parallel relationship and to be located near the neutral axis of the gooseneck portion.

The objects of the present invention are to provide a steering mechanism for an articulated vehicle that includes a rack and pinion arrangement maintained in meshing engagement through a pair of flanged guide rollers positioned along an axis that is perpendicular to the longitudinal center axis of each of the racks; to provide a rack and pinion steering mechanism for an articulated vehicle that includes a pair of double-acting hydraulic steering cylinders each of which has the base end thereof pivotally carried by one of the frame sections of the vehicle while the rod end thereof is restrained from movement along mutually perpendicular axes by a guide roller; and to provide a constant torque steering arrangement for an earthmoving scraper which includes a pair of steering cylinders supported by the gooseneck along laterally spaced axes which are parallel to the longitudinal axis of the scraper and located in a horizontal plane adjacent the neutral axis of the gooseneck.

Other objects and advantages of the present invention will be apparent from the following detailed description when taken with the drawings in which:

FIG. 1 is an elevational view showing an articulated vehicle incorporating a steering mechanism made in accordance with the invention;

FIG. 2 is an enlarged view taken on line 2—2 of FIG. 1.

FIG. 3 is a view taken on line 3—3 of FIG. 2;

FIG. 4 is a sectional view taken on line 4—4 of FIG. 2;

Figures 5, 6:
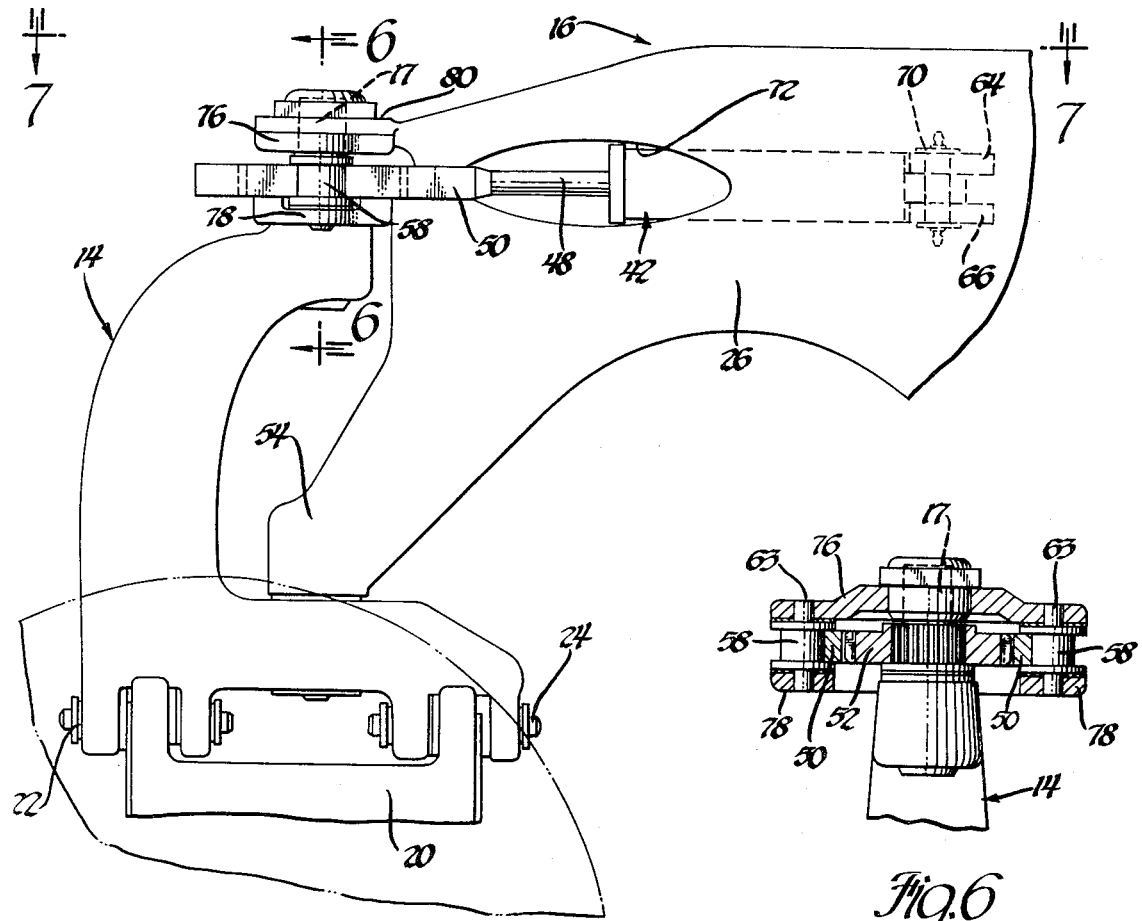
FIG. 5 is a view showing a modified version of the invention shown in FIGS. 1 through 4.
FIG. 6 is a secional view taken on line 6—6 of FIG. 5.

Referring to the drawings and more particularly FIG. 1 and 3 thereof, an off-highway earthmoving vehicle is shown comprising an overhung wheeled tractor 10 and a trailing scraper bowl 12. The tractor 10 is joined to the scraper bowl 12 through an L-shaped steering frame member 14 which is hingedly connected to a pull yoke frame member 16 for relative steering articulation about a vertical steering axis A—A defined by an upper king-pin 17 and a lower king-pin 18. As is conventional with vehicles of this type, the steering frame member 14 is carried by the tractor 10 at a point located above the rotational axis 19 of the tractor drive wheels and is connected to the tractor frame 20 by a pair of axially aligned and horizontally orientated pivot connections 22 and 24 which permit the tractor 10 to oscillate about a longitudinally extending horizontal axis so as to permit the vehicle to traverse irregular terrain.

The pull yoke frame member 16 includes a gooseneck that is formed by a pair of diverging arms 26 and 27 which extend rearwardly and downwardly for integral connection with a transverse torque tube 28 as seen in phantom lines in FIG. 2. The opposite ends of the torque tube 28 rigidly carry rearwardly extending and laterally spaced pull arms one of which is indicated by the reference numeral 30. Each pull arm 12 connected to the side wall of the trailing scraper bowl 12 by a spherical joint 32 for supporting the bowl in the usual manner for movement about a horizontal axis. In this regard, a suitable hydraulic bowl cylinder 34 extends between an upper portion of each arm 26 and 27 and the forward end of the scraper bowl 12 for positioning the latter between a lowered-dig position and a raised-carry position.

Relative steering articulation of the above-described vehicle is realized through a steering mechanism 36 which is incorporated with the steering frame member 14. In this regard, the lower portion of the steering frame member 14 is rigidly formed with a pair of vertically spaced horizontal support plates 38 and 40 which extend rearwardly and terminate adjacent the torque tube 28 as seen in FIG. 2. Located between the support plates are a pair of double-acting hydraulic steering cylinders 42 and 44 each of which includes a cylinder member 46 and a relatively reciprocable piston member 48.

Each of the steering cylinders 42 and 44 has its longitudinal axis located along an axis which is parallel to the longitudinal axis of the tractor 10 and has the rod end of the piston member 48 integrally formed with a rack 50 which extends axially forwardly for meshing engagement with a pinion 52. In this instance, the pinion 52 is splined to an adapter 53 secured to the lower king-pin 18 which in turn is rigidly secured to a lower king-pin arm 54 which is a rigid part of the gooseneck. The base end of each of the cylinder members 46 is pivotally connected to the rear end of the steering frame member 14 between the support plates 38 and 40 by a pin 56 located along an axis parallel to the vertical steering axis A—A. As a result, manufacturing needs not to be held closely in order to obtain proper meshing engagement between the rack 50 and the pinion 52. In addition, each of the racks 50 is maintained in meshing engagement with the pinion 52 by a guide roller 58 which has a pair of integrally formed radially extending flanges 60 and 62 for restricting any vertical movement of the rack relative to the pinion. As best seen in FIG. 4, each guide roller 58 is rotatably carried between disk type bushings by a vertically orientated shaft 63 the opposite ends of which are secured to the support plates 38 and 40. It will also be noted that, although not shown, a sheet metal housing would be provided for enclosing the steering mechanism 36 so as to protect the various parts thereof from damage and contamination by foreign particles.

As should be apparent from the above description, steering movement of the tractor 10 relative to the trailing scraper bowl 12 is realized by expanding one of the steering cylinders while contracting the other in a well known manner. For example, as seen in FIG. 2, by directing pressurized fluid to the piston end of the steering cylinder 42 and the rod end of steering cylinder 44 while exhausting the opposite ends of each steering cylinder, the tractor 10 will rotate in a clockwise direction about the vertical steering axis A—A. This occurs due to the fact that the scraper bowl 14 is the heavier portion of the two sections of the vehicle and therefore the pinion 52 serves as a reaction member as the racks 50 are moved relative thereto. During such movement the guide rollers 58 serve to maintain engagement of each rack 50 with the pinion 52 to assure uniformity in the relative steering articulation between the front and rear sections of the vehicle.

Figure 7:
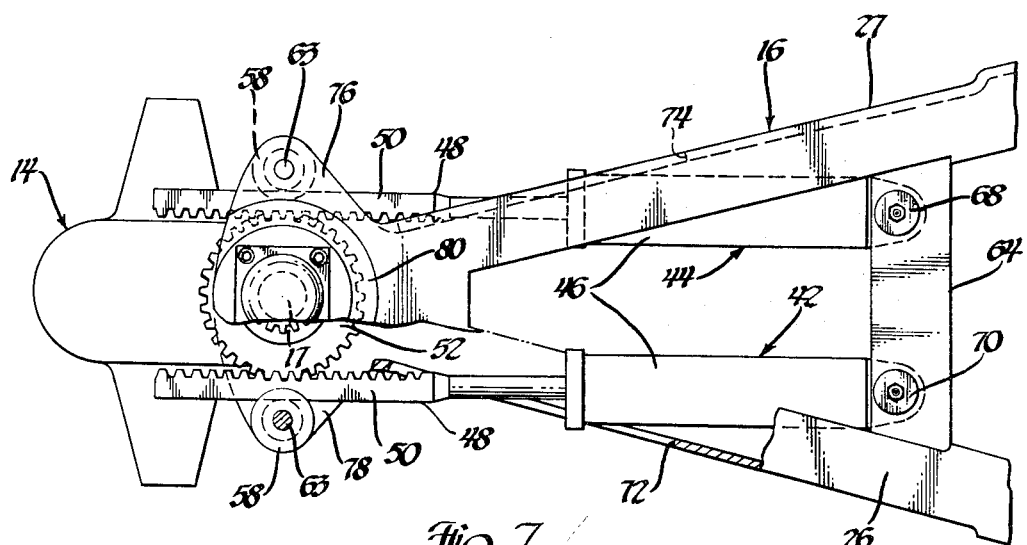
FIG. 7 is a plane view taken on line 7—7 of FIG. 5.

FIGS. 5 through 7 show a modified version of the invention described above and it will be noted that all parts corresponding to those heretofore described are identified by corresponding reference numerals. In this instance, pinion 52 is splined to the upper king-pin 17 which in turn is rigidly connected to the upper portion of the steering frame member 14 carried by the tractor 10. The modified version of the invention also differs from that shown in FIGS. 1 through 4 in that the steering cylinders 42 and 44 are carried by the gooseneck of the pull yoke frame member 16 and have the base ends thereof pivotally connected to a pair of parallel cross bars 64 and 66 by vertically orientated pins 68 and 70. The opposite ends of each cross bar 64 and 66 are rigidly secured to the arms 26 and 27 and the arrangement is such that the cylinder members 46 extend through oblong openings 72 and 74 formed in the arms for connection with the pins 68 and 70. In order to decrease stress concentrations, the steering cylinders 42 and 44 have the longitudinal center axis thereof positioned in a horizontal plane which passes near the neutral axis of the gooseneck. As in the case with the invention as seen in FIGS. 1-4, Each steering cylinder 42 and 44 includes a piston member 48 which is formed with a rack 50 that meshes with the pinion 52 and is maintained in engagement therewith by a guide roller 58 which in this case is carried by a pair of vertically spaced outwardly extending arms 76 and 78 formed integrally with upper king-pin arm 80 which is rigid with the gooseneck. Each guide roller 58 also includes radially extending flanges 60 and 62 which serve as stops for preventing the rack 50 from moving in a vertical direction relative to the pinion.

Operation of the modified steering mechanism of FIGS. 5 through 7 is identical to the steering mechanism shown in FIGS. 1 through 4 in that expansion and contraction of the steering cylinders 42 and 44 causes the tractor 10 to be rotated about the vertical steering axis A—A relative to the scraper bowl 12. It will be noted, however, that in this case inasmuch as the steering cylinders 42 and 44 are carried by the pull yoke frame member 16 which forms a part of the heavier of the two sections of the vehicle, the pinion 52 is rotated when the aforementioned cylinders are actuated resulting in the steering frame member 14 and the connected tractor 10 rotating about the steer axis A—A in a corresponding direction.

Various changes and modifications can be made in this construction without departing from the spirit of the invention. Such changes and modifications are contemplated by the inventor and he does not wish to be limited except by the scope of the appended claims.

I claim:

1. A steering mechanism for an articulated vehicle having first and second frame sections adapted to be aligned along the longitudinal axis of the vehicle when the latter is moving in a straight-ahead direction, means pivotally interconnecting said frame sections about a vertical steering axis for relative steering articulation therebetween to either side of straight-ahead steering alignment of said frame sections, a pinion fixed to one of said frame sections with its rotational center located along said vertical steering axis, a pair of double-acting hydraulic steering cylinders mounted on the other of said frame sections along axes which are parallel to said longitudinal axis and located on opposite sides of the vertical steering axis, each of said steering cylinders including relatively reciprocable piston and cylinder members, means pivotally connecting the rear end of each cylinder member to said other of said frame sections along axes parallel to said vertical steering axis, said piston member having the rod portion thereof formed with a rack which meshes with said pinion, and a guide roller operatively associated with the rack of each of the steering cylinders, said guide roller including radially extending means for maintaining the rack in meshing engagement with the pinion during operation of the steering cylinders.

2. A steering mechanism for an articulated vehicle including a tractor and a trailing scraper bowl, the tractor having an L-shaped steering frame member connected thereto for oscillation about a horizontal axis extending parallel to the longitudinal axis of the vehicle, a pull yoke frame member having a gooseneck and a pair of laterally spaced pull arms for supporting the forward end of said scraper bowl, king-pin means connecting the gooseneck to the steering frame member and defining a vertical steering axis for relative steering articulation of the tractor and the scraper bowl to either side of straight-ahead steering alignment, said king-pin means being rigidly secured to one of said frame members and having a pinion splined thereto, a pair of double-acting hydraulic steering cylinders carried by the other of said frame members along laterally spaced axes which are parallel to said longitudinal axis and located on opposite sides of the vertical steering axis, each of said steering cylinders including a piston member and a cylinder member, means pivotally connecting the base end of each cylinder member to said other of said frame members along an axis parallel to said vertical steering axis, said piston member having the rod portion thereof formed with a rack which meshes with said pinion, and a guide roller formed with a pair of radially extending flanges engaging the rack of each of the steering cylinder for maintaining the rack in meshing engagement with the pinion during operation of the steering cylinders for steering the tractor relative to the scraper bowl.

3. The steering mechanism of claim 2 wherein said one of said frame members is the L-shaped steering frame member and the other of said frame members is the pull yoke frame member.

4. The steering mechanism of claim 2 wherein said one of said frame members is the pull yoke frame member and the cylinder member of each of the steering cylinders extends through an opening in the gooseneck and is supported by the latter.

* * * * *